(No Model.)  2 Sheets—Sheet 1.
F. ELLSWORTH.
HORSESHOEING APPARATUS.
No. 597,317.  Patented Jan. 11, 1898.
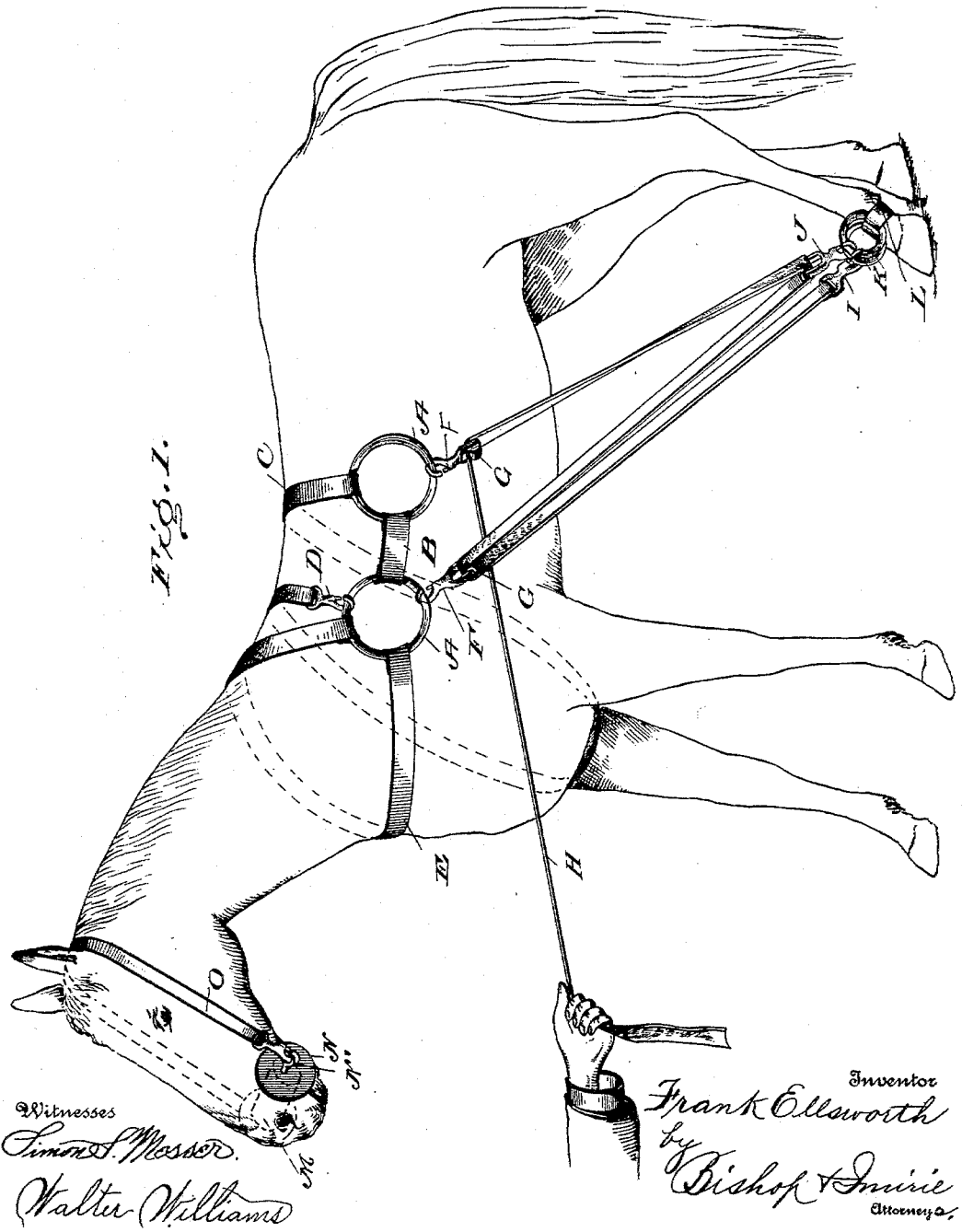
Witnesses
Simon P. Mosser
Walter Williams
Inventor
Frank Ellsworth
by
Bishop & Imirie
Attorneys

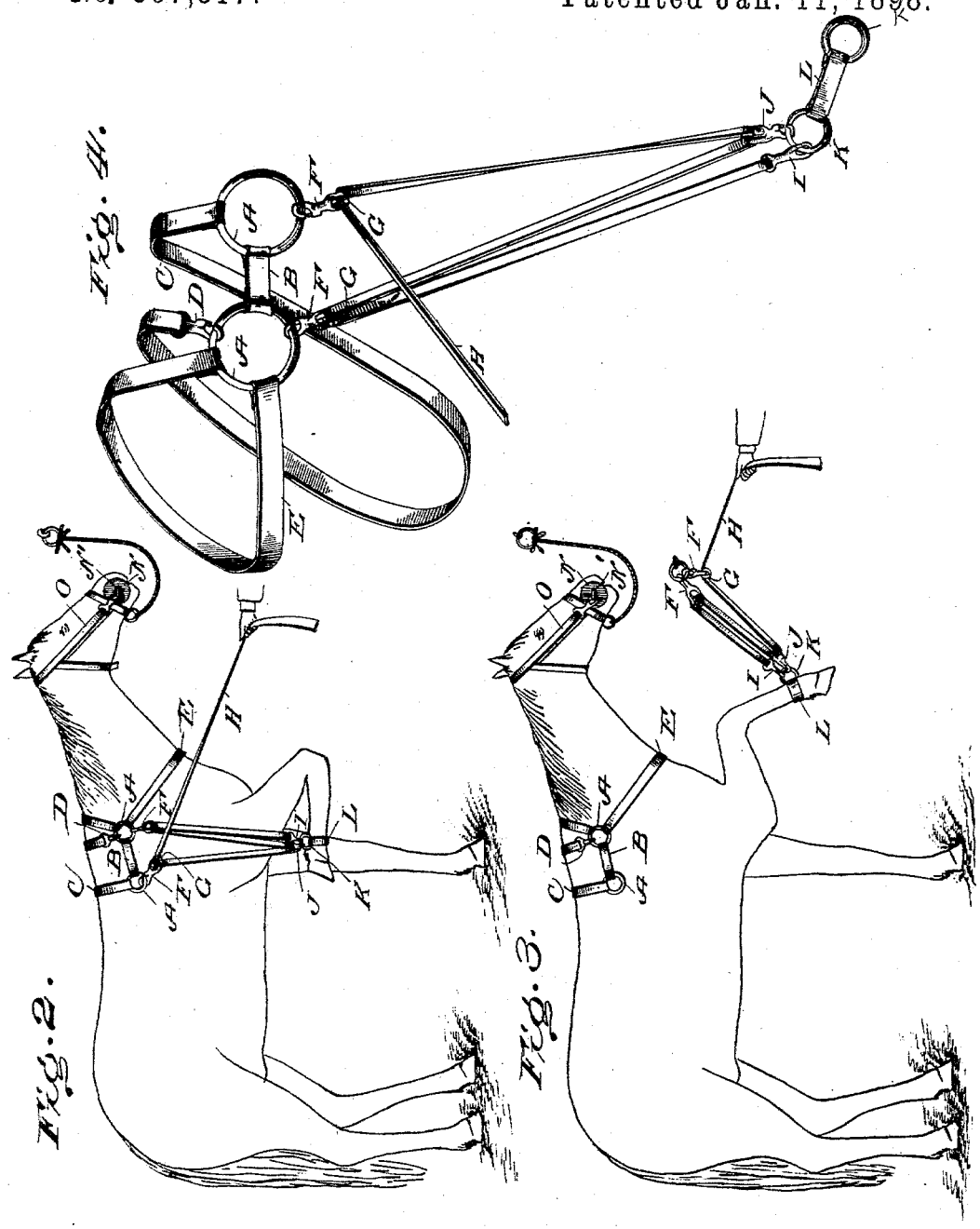

UNITED STATES PATENT OFFICE.

FRANK ELLSWORTH, OF ALLIANCE, OHIO, ASSIGNOR OF ONE-HALF TO CHARLES F. PEARSOL, OF SAME PLACE.

HORSESHOEING APPARATUS.

SPECIFICATION forming part of Letters Patent No. 597,317, dated January 11, 1898.

Application filed June 14, 1897. Serial No. 640,741. (No model.)

*To all whom it may concern:*

Be it known that I, FRANK ELLSWORTH, a citizen of the United States, residing at Alliance, in the county of Stark and State of Ohio, have invented certain new and useful Improvements in Apparatus for Controlling Horses While Being Shod, of which the following is a specification.

The object of my invention is to provide means for controlling an unruly horse while being shod without injuring either the horse or the workman. This object I accomplish by the use of the apparatus illustrated in the accompanying drawings; and the invention consists in certain novel features hereinafter described and claimed.

In the annexed drawings, Figure 1 is a perspective view showing the device in position to raise the back foot of a horse. Fig. 2 is a similar view showing the device applied to the front foot and the foot raised. Fig. 3 is a similar view showing the device adapted to raise the front foot forward. Fig. 4 is a view of the harness removed from the horse, and Fig. 5 is a detail view of the headstall.

In carrying out my invention I employ a pair of rings A A, connected by a short strap B, and I attach to the rear ring a strap C, adapted to pass therefrom over the back of the horse, forward between the front legs, then around the leg on the off side, and up over the back to the front ring, to which it is connected by a snap-hook D. A shoulder strap or loop E has both its ends attached to the front ring A and is adapted to pass around the animal's neck and rest on his shoulders, as clearly shown. Engaging and depending from the rings A A are snap-hooks F, having rollers G in their lower ends, over which passes the operating-strap H. This strap H has a snap-hook I at one end, and between the snap-hooks F a traveling snap-hook J is mounted on the strap. The hooks I J are engaged in and hold the rings K, secured to the ends of a strap L, adapted to pass around the foot of the horse below the fetlock. The operating-strap thus passes up from the rings K to the forward snap-hook F, thence back to the hook J, thence to the rearward hook F, and thence outward to any point most convenient to the operator.

To divert the attention of the horse, I employ a headstall consisting of an elliptical block M, adapted to fit in the animal's mouth, its elliptical shape preventing turning, and lateral movement being prevented by the disks N at its ends. These disks are secured to the ends of the block by screws or hooks N', and attached to said screws or hooks is an elastic strap O, adapted to pass over the head, as shown. The elastic strap yields sufficiently to lead the horse into the belief that he can eject the block, but at the same time is strong enough to foil his attempts to eject it.

When it is desired to raise the foot to be shod, the assistant pulls on the free end of the operating-strap and the force thus applied is transmitted through the strap, so as to exert an upward pull on the hoof and raise the same. The workman can then shoe the horse without any trouble and without having to watch the action of the horse. Should the animal attempt to kick, a slight pull on the operating-strap controls him and frustrates the attempt.

The device is very light and can be used on either side of the horse and to raise either the front or the back feet. The shoulder strap or loop and the side retaining-strap passing around the leg maintain the apparatus in proper operative position and prevent slipping of the same along the animal's back.

Should it be desired to raise the front foot forward or the back foot rearward, the hooks F are engaged in a ring secured in the wall of the shop or in a post therein.

The retaining-strap passing over the back and around one of the forelegs serves as a support for the operating-strap and also as an aid to said rope. Should the horse attempt to kick or jump, a strong pull on the operating-rope will draw on the retaining-strap and cause the same to pull on the front leg of the horse, the result being that the horse will cease his efforts to kick or jump and apply his energy to keeping on his feet. Should the animal simply lie down, as sometimes happens, there is no complicated harness confining his body to injure him or retard his rising. On the contrary, a gentle pull on the operating-rope will urge him to arise. It will be noticed that the operating rope or strap passes back and forth between the hoof and the supporting-loop and retaining-strap, so that if it becomes necessary to pull on the operating-rope not only is the hoof to which it is attached raised, but a pull is also exerted on the front leg around which the retaining-strap is passed. Furthermore, the pressure is divided between the neck and the foreleg.

Having thus described my invention, what I claim, and desire to secure by Letters Patent, is—

1. In an apparatus for controlling horses, a loop adapted to pass around the horse's neck, a retaining-strap passing over the horse's back, and around one of the front legs, and an operating-strap hung from the loop and the retaining-strap and adapted to be attached to the foot of the horse to raise the same.

2. In an apparatus for controlling horses, a pair of connected rings, a loop attached to the forward ring, adapted to pass around the neck of the horse and rest on his shoulders, a retaining-strap having its ends attached to said rings and its intermediate portion adapted to pass over the horse's back, and around one of his front legs, and an operating-strap hung from said rings and adapted to raise a foot of the horse.

3. In an apparatus for controlling horses, a pair of connected rings, a loop attached to the forward ring and adapted to pass around the horse's neck, a retaining-strap attached to the said rings and passing around one of the horse's front legs, rollers hung from said rings, a band adapted to pass around a foot of the horse, rings in the ends of said band, and an operating-strap passing to and fro between said rings and the rollers.

FRANK ELLSWORTH.

Witnesses:
CHAS. F. PEARSOL,
I. H. SMITH.